(12) United States Patent
Wang et al.

(10) Patent No.: US 9,052,541 B2
(45) Date of Patent: Jun. 9, 2015

(54) LCD MODULE AND LCD DEVICE

(76) Inventors: Jiaqiang Wang, Shenzhen (CN); Guofu Tang, Shenzhen (CN)

( * ) Notice: Subject to any disclaimer, the term of this patent is extended or adjusted under 35 U.S.C. 154(b) by 183 days.

(21) Appl. No.: 13/642,523

(22) PCT Filed: Sep. 12, 2012

(86) PCT No.: PCT/CN2012/081285
§ 371 (c)(1),
(2), (4) Date: Oct. 20, 2012

(87) PCT Pub. No.: WO2014/032335
PCT Pub. Date: Mar. 6, 2014

(65) Prior Publication Data
US 2014/0063400 A1    Mar. 6, 2014

(30) Foreign Application Priority Data
Aug. 31, 2012    (CN) .......................... 2012 1 0319105

(51) Int. Cl.
*G02F 1/1333*    (2006.01)
*F21V 8/00*    (2006.01)

(52) U.S. Cl.
CPC ................... *G02F 1/133308* (2013.01); *G02F 2001/133317* (2013.01); *G02B 6/0085* (2013.01); *G02B 6/0088* (2013.01)

(58) Field of Classification Search
CPC ............................................... G02F 1/133308
See application file for complete search history.

(56) References Cited

U.S. PATENT DOCUMENTS

| | | | |
|---|---|---|---|
| 8,421,950 B2 | 4/2013 | Kim | |
| 2004/0207996 A1* | 10/2004 | Kao | ................................ 362/31 |
| 2008/0180593 A1* | 7/2008 | Cho et al. | ........................ 349/58 |
| 2011/0007236 A1* | 1/2011 | Kim et al. | ........................ 349/58 |
| 2011/0141391 A1 | 6/2011 | Kim | |

FOREIGN PATENT DOCUMENTS

| | | |
|---|---|---|
| CN | 101994950 A | 3/2011 |
| CN | 102042539 A | 5/2011 |
| CN | 202266936 U | 6/2012 |
| CN | 202266939 U | 6/2012 |
| CN | 102608788 A | 7/2012 |
| CN | 202394013 U | 8/2012 |
| CN | 202677012 U | 1/2013 |
| WO | WO2011080954 A1 | 7/2011 |

OTHER PUBLICATIONS

Li Jie, the International Searching Authority written comments, Jun. 2013, CN.

* cited by examiner

*Primary Examiner* — Phu Vu

(57) ABSTRACT

A liquid crystal display (LCD) module includes a middle frame, a backplane and a light source heat sink. The light source heat sink is fixed to the backplane. The middle frame includes a horizontal wall and a vertical wall. The light source heat sink includes a vertical wall. The middle frame vertically corresponds to the light source heat sink. The vertical wall of the middle frame and the vertical wall of the light source heat sink are correspondingly configured with interoperable fastening structures. The middle frame and the light source heat sink are positioned in the vertical direction through the interoperable fastening structures to increase twisting resistance of the middle frame.

12 Claims, 3 Drawing Sheets

LCD MODULE AND LCD DEVICE

TECHNICAL FIELD

The present disclosure belongs to the field of liquid crystal displays (LCDs), and more particularly to an LCD module and an LCD device.

BACKGROUND

As shown in FIG. 1, a typical liquid crystal display (LCD) device, such as LCD and LCD TV set, includes an LCD module. The LCD module generally includes as front frame 1, an LCD panel 5, a middle frame 2, a backlight module 6, and a backplane 3. The backlight module 6 includes an optical film, a light guide panel (LGP), a light source, and a light source heat sink 4. The front frame 1, the middle frame 2, and the backplane 3 have different functions. The front frame 1 is mainly used to fix the LCD panel 5 and prevent the LCD panel 5 from dropping. The middle frame 2 is mainly used to support the LCD panel 5 and shield a partial backlight module 6 from light leakage. The backplane 3 is mainly used to support and contain the optical film, the LGP and the light source and improve planeness of the backlight module 6. The light source heat sink 4 is generally made using an aluminum extrusion process.

The middle frame 2 of the typical LCD module is positioned above the backplane 3 and is not fixed in a vertical direction. This assembly mode results in that twisting resistance of the middle frame 2 is poor and the middle frame 2 is easy to deform when the middle frame 2 supports the LCD panel 5 and may not provide enough support.

SUMMARY

In view of the above-described problems, the aim of the present disclosure is to provide as liquid crystal display (LCD) device and an LCD module with higher assembly strength and stronger twisting resistance of a middle frame.

A first technical scheme of the present disclosure is that an LCD module comprises a middle frame, a backplane and a light source heat sink. The light source heat sink is fixed to the backplane. The middle frame comprises a horizontal wall and a vertical wall. The light source heat sink comprises a vertical wall. The middle frame vertically corresponds to the light source heat sink. The vertical wall of the middle frame and the vertical wall of the light source heat sink are correspondingly configured with interoperable fastening structures. The interoperable fastening structure of the vertical wall of the middle frame is a protrusion, and the interoperable fastening structure of the vertical wall of the light source heat sink is a groove. The groove is a dovetail groove. The protrusion is configured with a buckle. The buckle is clamped into the groove. The horizontal wall of the middle frame is configured with a first retaining wall that is parallel to the vertical wall of the middle frame. An outer surface of the first retaining wall is fitted with an inner surface of the vertical wall of the light source heat sink. The horizontal wall of the middle frame is configured with a second retaining wall that is parallel to the vertical wall of the middle frame. The inner surface of the second retaining wall is fitted with the outer surface of the vertical wall of the light source heat sink. The second retaining wall is vertically aligned with the vertical wait of the front frame. The backplane comprises a vertical wall. The second retaining wall is vertically aligned with the vertical wall of the backplane.

A second technical scheme of the present disclosure is that: an LCD module comprises a middle frame, a backplane and a light source heat sink. The light source heat sink is fixed to the backplane. The middle frame comprises a horizontal wall and a vertical wall. The light source heat sink comprises a vertical wall. The middle frame vertically corresponds to the light source heat sink. The vertical wall of the middle frame and the vertical wall of the light source heat sink are correspondingly configured with interoperable fastening structures.

In one example, the interoperable fastening structure of the vertical wall of the middle frame is a protrusion, and the interoperable fastening structure of the vertical wall of the light source heat sink is a groove. The protrusion is inserted into the groove.

In one example, the interoperable fastening structure of the vertical wall of the middle frame is a groove, and the interoperable fastening structure of the vertical wall of the light source heat sink is a protrusion. The protrusion is inserted into the groove.

In one example, the groove is a dovetail groove. The protrusion is configured with a buckle and the buckle is clamped into the groove. The middle frame and the light source heat sink are in a fixed position more reliably in a vertical direction. The function of the middle frame supported the LCD panel is better realized.

In one example, the horizontal wall of the middle frame is configured with a first retaining wall that is parallel to the vertical wall of the middle frame. The outer surface of the first retaining wall is fitted with the inner surface of the vertical wall of the light source heat sink. The first retaining wall is used together with a vertical positioning structure between the middle frame and the light source heat sink to further increase twisting resistance of the middle frame.

In one example, the LCD module further comprises a front frame. The front frame comprises a vertical wall. The inner surface of the vertical wall of the front frame is fitted with the outer surface of the vertical wall of the middle frame. The backplane further comprises a vertical wall. The vertical wall of the front frame is vertically aligned with the vertical wall of the backplane. One side of the frame of the LCD module is shortened by a wall thickness of one front frame or backplane. Thus, the LCD module with a shorter frame is obtained.

In one example, the horizontal wall of the middle frame is configured with a second retaining wall that is parallel to the vertical wall of the middle frame. The inner surface of the second retaining wall is fitted with the outer surface of the vertical wall of the light source heat sink. The second retaining wall and the first retaining wall lock the inner surface and the outer surface of the light source heat sink so that the middle frame may not easily turn and twisting resistance of the middle frame is further increased.

In one example, the backplane further comprises a vertical wall. The second retaining wall is vertically aligned with the vertical wall of the backplane. This belongs to a design of a narrower frame.

In one example, the second retaining wall is vertically aligned with the vertical wall of the front frame. This belongs to a design of a narrower frame.

A second technical scheme of the present disclosure is as follows: an LCD device comprises an LCD module. The LCD module comprises a middle frame, a backplane and a light source heat sink. The light source heat sink is fixed to the backplane. The middle frame comprises a horizontal wall and a vertical wall. The light source heat sink comprises a vertical wall. The middle frame vertically corresponds to the light source heat sink. The vertical wall of the middle frame and the vertical wall of the light source heat sink are correspondingly configured with interoperable fastening structures.

In one example, the interoperable fastening structure of the vertical wall of the middle frame is a protrusion, and the interoperable fastening structure of the vertical wall of the light source heat sink is a groove. The protrusion is inserted into the groove.

In one example, the groove is a dovetail groove. The protrusion is configured with a buckle and is clamped into the groove.

In one example, the interoperable fastening structure of the vertical wall of the middle frame is a groove, and the interoperable fastening structure of the vertical wall of the light source heat sink is a protrusion. The protrusion is inserted into the groove.

In one example, the horizontal wall of the middle frame is configured with a first retaining wall that is parallel to the vertical wall of the middle frame. The outer surface of the first retaining wall is fitted with the inner surface of the vertical wall of the light source heat sink.

In one example, the LCD module further comprises a front frame. The front frame comprises a vertical wall. The inner surface of the vertical wall of the front frame is fitted with the outer surface of the vertical wall of the middle frame. The backplane further comprises a vertical wall. The vertical wall of the front frame is vertically aligned with the vertical wall of the backplane.

In one example, the horizontal wall of the middle frame is configured with a second retaining wall that is parallel to the vertical wall of the middle frame. The inner surface of the second retaining wall is fitted with the outer surface of the vertical wall of the light source heat sink.

In one example, the backplane further comprises a vertical wall. The second retaining wall is vertically aligned with the vertical wall of the backplane. The second retaining wall is vertically aligned with the vertical wall of the front frame.

The plane of the middle frame of the LCD module of the present disclosure is defined as a level. The direction vertical to the level is a vertical plane.

The vertical alignment of the two vertical walls of the present disclosure means that position of the inner wall of the vertical wall having to wall thickness that is slightly thinner is not greater that position of the inner wall of the other vertical wall, and position of the outer wall of the vertical wall having a wall thickness that is slightly thinner is not greater than position of the outer wall of the other vertical wall.

Advantages of the present disclosure are summarized below: the vertical corresponding relationship between the middle frame and the light source heat sink is used by the LCD module of the present disclosure. The vertical wall of the middle frame is configured with a protrusion. The vertical wall of the light source heat sink is correspondingly configured with a groove. The protrusion is inserted into the groove. Thus, the middle frame and the light source heat sink are positioned in the vertical direction. Twisting resistance of the middle frame may be increased. When the middle frame supports the LCD panel, the middle frame is not easy to deform, thereby better performing a supporting function.

DETAILED DESCRIPTION

Figure 1:
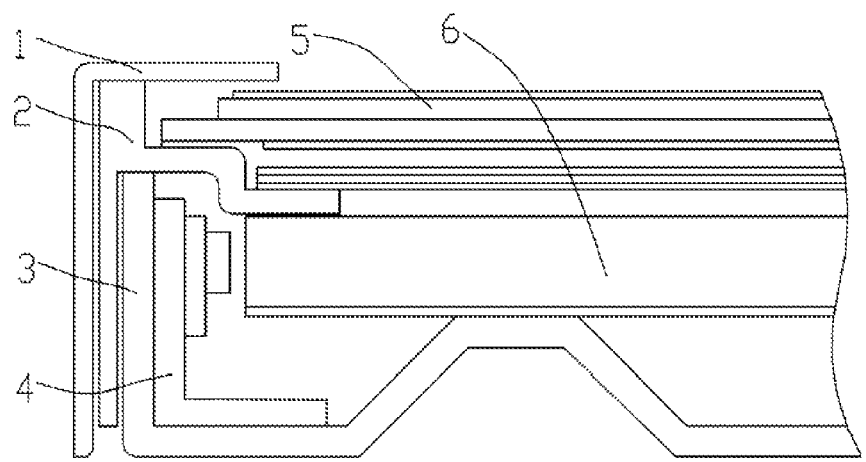
FIG. 1 is a structural diagram of a typical LCD module.
Figure 2:
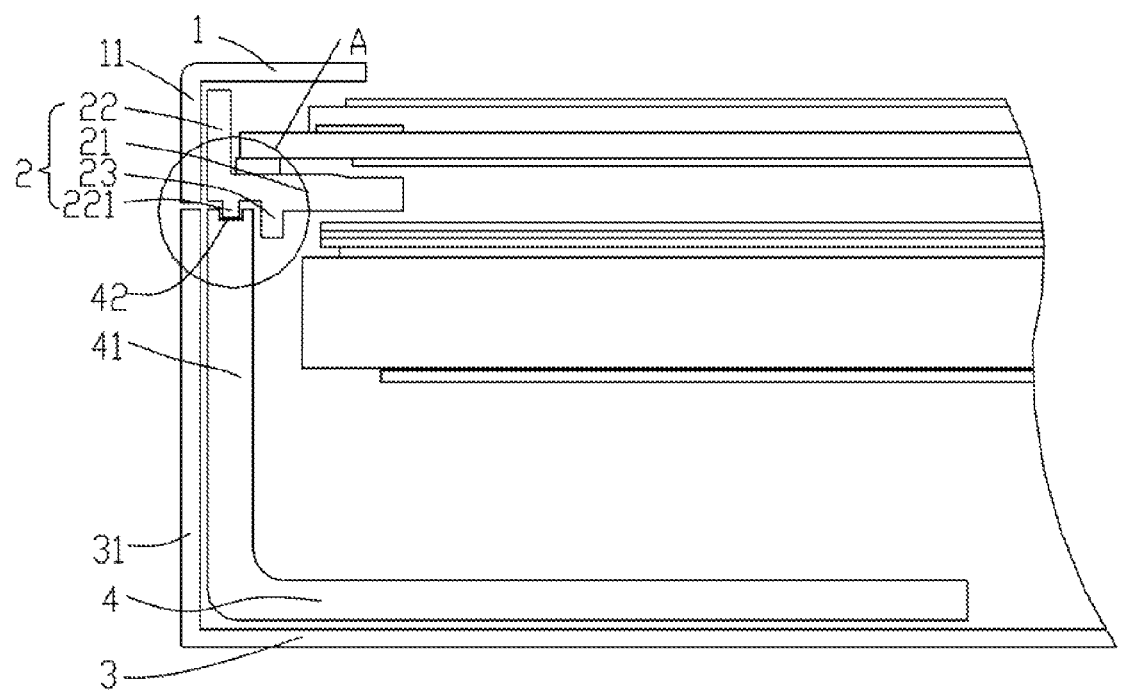
FIG. 2 is a structural diagram of a first example of an LCD module of the present disclosure.
Figure 3:
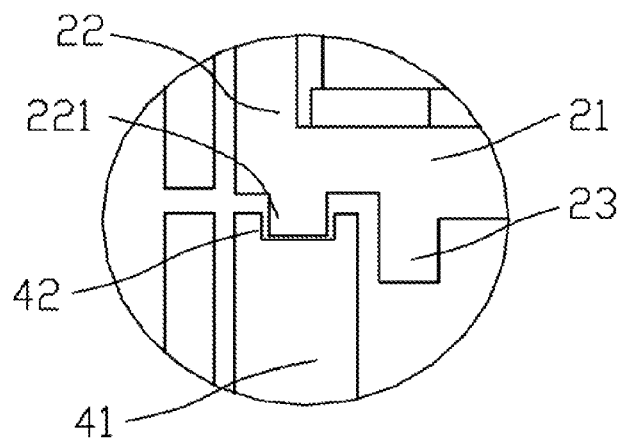
FIG. 3 is an enlarged view of A shown in FIG. 2.

The present disclosure discloses an LCD device comprising an LCD module. As a first example of the LCD module of the present disclosure, as shown in FIG. 2 and FIG. 3, the LCD module comprises a front frame 1, a middle frame 2, a backplane 3, and a light source heat sink 4. The light source heat sink 4 is fixed to the backplane 3. The middle frame 2 comprises a horizontal wall 21 and a vertical wall 22. The light source heat sink 4 comprises a vertical wall 41. The middle frame 2 vertically corresponds to the light source heat sink 4. The vertical wall 22 of the middle frame 2 and the vertical wall 41 of the light source heat sink 4 are correspondingly configured with interoperable fastening structures. Specially, the interoperable fastening structure of the vertical wall 22 of the middle frame is a protrusion 221. The interoperable fastening structure of the vertical wall 41 of the light source heat sink is a groove 42. The protrusion 221 is inserted into the groove 42.

The plane of the middle frame of the LCD module of the present disclosure is defined as a level. The direction vertical to the level is a vertical plane.

A vertical corresponding relationship between the middle frame 2 and the light source heat sink 4 is used by the LCD module of the present disclosure. The vertical wall 22 of the middle frame is configured with the protrusion 221. The vertical wall 41 of the light source heat sink is correspondingly configured with the groove 42. The protrusion 221 is inserted into the groove 42. Thus, the middle frame 2 and the light source heat sink 4 are in a fixed position in the vertical direction. Twisting resistance of the middle frame 2 may be increased. When the middle frame supports the LCD panel, the middle frame 2 is not easy to deform, thus improving support.

In the example, the groove 42 on the light source heat sink may penetrate through an entire length of the light source heat sink 4. Accordingly, the protrusion 221 on the middle frame may also be in a complete strip-shaped. Optionally, if the groove 42 has a segmented structure, it is feasible that the plurality of grooves 42 are on the light source heat sink. Accordingly, the protrusions 221 on the middle frame also have segmented structures and a plurality of protrusions 221 are arranged.

In the example, the front frame 1 comprises a vertical wall 11. An inner surface of the vertical wall 11 of the front frame is fitted with an outer surface of the vertical wall 22 of the middle frame. The backplane 3 further comprises a vertical wall 31. The vertical wall 11 of the front frame is vertically aligned with the vertical wall 31 of the backplane 3. One side of the frame of the LCD module is shortened by a wall thickness of one front frame or backplane. Thus, the LCD module with a narrower frame is obtained. The vertical alignment of the two vertical walls of the present disclosure means that a position of the inner wall of the vertical wall having a wall thickness that is slightly thinner than the other inner wall is not greater than a position of the inner wall of the other vertical wall, and position of the outer wall of the vertical wall having a wall thickness that is slightly thinner than the other outer wall is not greater than position of the outer wall of the other vertical wall.

In the example, the horizontal wall 21 of the middle frame is configured with a first retaining wall 23. The first retaining wall 23 is parallel to the vertical wall 22 of the middle frame.

The outer surface of the first retaining wall 23 is fitted with the inner surface of the vertical wall 41 of the light source heat sink. The first retaining wall 23 is used together with a vertical positioning structure between the middle frame 2 and the light source heat sink 4 to further increase twisting resistance of the middle frame 2.

In this example, if the interoperable fastening structure of the vertical wall of the middle frame is a groove, the interoperable fastening structure of the vertical wall of the light source heat sink is a protrusion. The protrusion is inserted into the groove. Similarly, the middle frame and the light source heat sink are in a fixed position in the vertical direction. Twisting resistance of the middle frame is increased, and a similar advantage is obtained.

Figure 4:
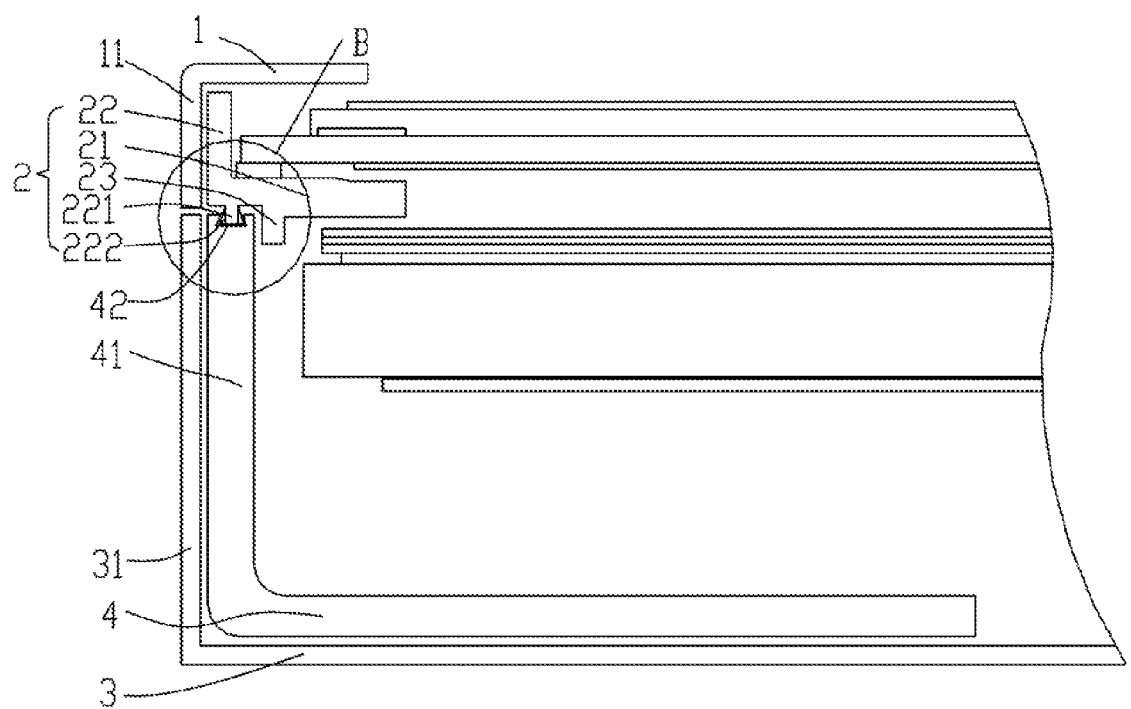
FIG. 4 is a structural diagram of a second example of an LCD module of the present disclosure.
Figure 5:
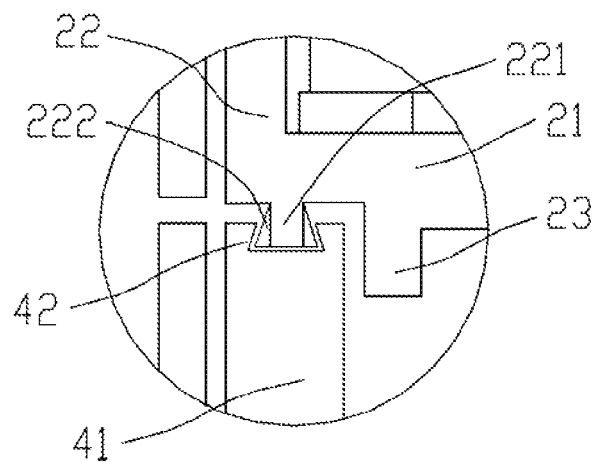
FIG. 5 is an enlarged view of B shown in FIG. 4.

As the second example of the LCD module of the present disclosure, as shown in FIG. 4 and FIG. 5, difference from the first example is that the groove 42 on the light source heat sink is a dovetail groove. The protrusion on the middle frame is configured with a buckle 222. The buckle 222 is clamped into the groove 42. Thus, the middle frame 2 and the light source heat sink 4 are in a fixed position more reliably in the vertical direction. The function of the middle frame 2 supporting the LCD panel is better realized.

Figure 6:
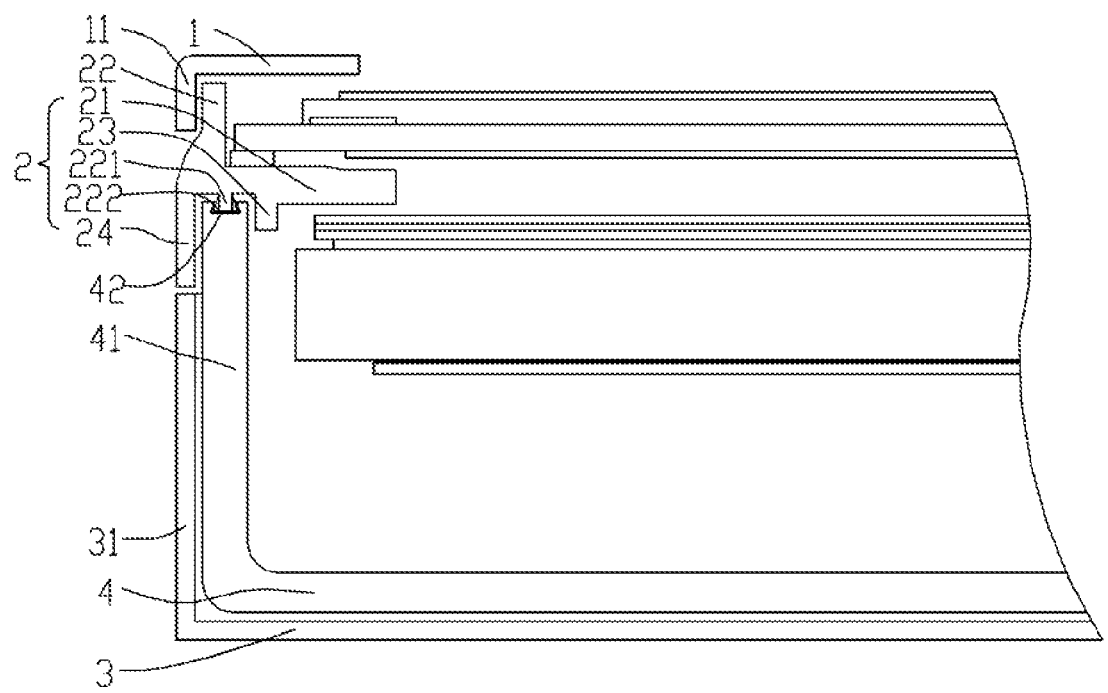
FIG. 6 is a structural diagram of a third example of an LCD module of the present disclosure.

As the third example of the LCD module of the present disclosure, as shown in FIG. 6, difference from the second example is that the horizontal wall 21 of the middle frame is configured with a second retaining wall 24. The second retaining wall 24 is parallel to the vertical wall 22 of the middle frame. The inner surface of the second retaining wall 24 is fitted with the outer surface of the vertical wall 41 of the light source heat sink. The second retaining wall 24 is vertically aligned with the vertical wall 11 of the front frame. Moreover, the second retaining wall 24 is vertically aligned with the vertical wall 31 of the backplane. In this example, the design of a narrower frame is still obtained. In addition, the second retaining wall 24 and the first retaining wall 23 lock the inner surface and the outer surface of the light source heat sink 4 so that the middle frame 2 may not easily turn and twisting resistance of the middle frame 2 is further increased. When the middle frame supports the LCD panel, the middle frame 2 is not easy to deform, thus improving support.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel may also make simple deductions or replacements, and all of which should be considered to belong, to the protection scope of the present disclosure.

We claim:

1. A liquid crystal display (LCD) module, comprising:
a middle frame,
a backplane and
a light source heat sink fixed to the backplane;
wherein the middle frame comprises a horizontal wall and a vertical wall; the light source heat sink comprises a vertical wall; the middle frame vertically corresponds to the light source heat sink; the vertical wall of the middle frame and the vertical wall of the light source heat sink are correspondingly configured with interoperable fastening structures;
wherein the interoperable fastening structure of the vertical wall of the middle frame is a protrusion, and the interoperable fastening structure of the vertical wall of the light source heat sink is a groove;
wherein the groove is a dovetail groove; the protrusion is configured with a buckle and the buckle is clamped into the groove;
wherein the horizontal wall of the middle frame is configured with a first retaining wall that is parallel to the vertical wall of the middle frame; an outer surface of the first retaining wall is fitted with an inner surface of the vertical wall of the light source heat sink;
wherein the horizontal wall of the middle frame is configured with a second retaining wall that is parallel to the vertical wall of the middle frame; the inner surface of the second retaining wall is fitted with the outer surface of the vertical wall of the light source heat sink; the second retaining wall is vertically aligned with the vertical wall of the front frame; and
wherein the backplane further comprises a vertical wall; the second retaining wall is vertically aligned with the vertical wall of the backplane.

2. A liquid crystal display (LCD) module, comprising:
a middle frame,
a backplane and
a light source heat sink fixed to the backplane;
wherein the middle frame comprises a horizontal wall and a vertical wall; the light source heat sink comprises a vertical wall; the middle frame vertically corresponds to the light source heat sink; the vertical wall of the middle frame and the vertical wall of the light source heat sink are correspondingly configured with interoperable fastening structures;
wherein the horizontal wall of the middle frame is configured with a first retaining wall that is parallel to the vertical wall of the middle frame; the outer surface of the first retaining wall is fitted with the inner surface of the vertical wall of the light source heat sink;
wherein the LCD module further comprises a front frame; the front frame comprises a vertical wall; the inner surface of the vertical wall of the front frame is fitted with the outer surface of the vertical wall of the middle frame; the backplane further comprises a vertical wall; the vertical wall of the front frame is vertically aligned with the vertical wall of the backplane.

3. The LCD module of claim 2, wherein the interoperable fastening structure of the vertical wall of the middle frame is a protrusion, and the interoperable fastening structure of the vertical wall of the light source heat sink is a groove; the protrusion is inserted into the groove.

4. The LCD module of claim 3, wherein the groove is a dovetail groove; the protrusion is configured with a buckle and the buckle is clamped into the groove.

5. The LCD module of claim 2, wherein the horizontal wall of the middle frame is configured with a second retaining wall that is parallel to the vertical wall of the middle frame; the inner surface of the second retaining wall is fitted with the outer surface of the vertical wall of the light source heat sink.

6. The LCD module of claim 5, wherein the backplane further comprises a vertical wall; the second retaining wall is vertically aligned with the vertical wall of the backplane.

7. The LCD module of claim 5, wherein the second retaining wall is vertically aligned with the vertical wall of the front frame.

8. A liquid crystal display (LCD) device, comprising:
an LCD module comprising a middle frame, a backplane and a light source heat sink; the light source heat sink is fixed to the backplane; and wherein the middle frame comprises a horizontal wall and a vertical wall; the light source heat sink comprises a vertical wall; the middle frame vertically corresponds to the light source heat sink; the vertical wall of the middle frame and the vertical wall of the light source heat sink are correspondingly configured with interoperable fastening structures;

wherein the horizontal wall of the middle frame is configured with a first retaining wall that is parallel to the vertical wall of the middle frame; the outer surface of the first retaining wall is fitted with the inner surface of the vertical wall of the light source heat sink;

wherein the LCD module further comprises a front frame; the front frame comprises a vertical wall; the inner surface of the vertical wall of the front frame is fitted with the outer surface of the vertical wall of the middle frame; the backplane further comprises a vertical wall; the vertical wall of the front frame is vertically aligned with the vertical wall of the backplane.

9. The LCD device of claim 8, wherein the interoperable fastening structure of the vertical wall of the middle frame is a protrusion, and the interoperable fastening structure of the vertical wall of the light source heat sink is a groove; the protrusion is inserted into the groove.

10. The LCD device of claim 9, wherein the groove is a dovetail groove; the protrusion is configured with a buckle and the buckle is clamped into the groove.

11. The LCD device of claim 8, wherein the horizontal wall of the middle frame is configured with a second retaining wall that is parallel to the vertical wall of the middle frame; the inner surface of the second retaining wall is fitted with the outer surface of the vertical wall of the light source heat sink.

12. The LCD device of claim 11, wherein the backplane further comprises a vertical wall; the second retaining wall is vertically aligned with the vertical wall of the backplane; the second retaining wall is vertically aligned with the vertical wall of the front frame.

* * * * *